UNITED STATES PATENT OFFICE.

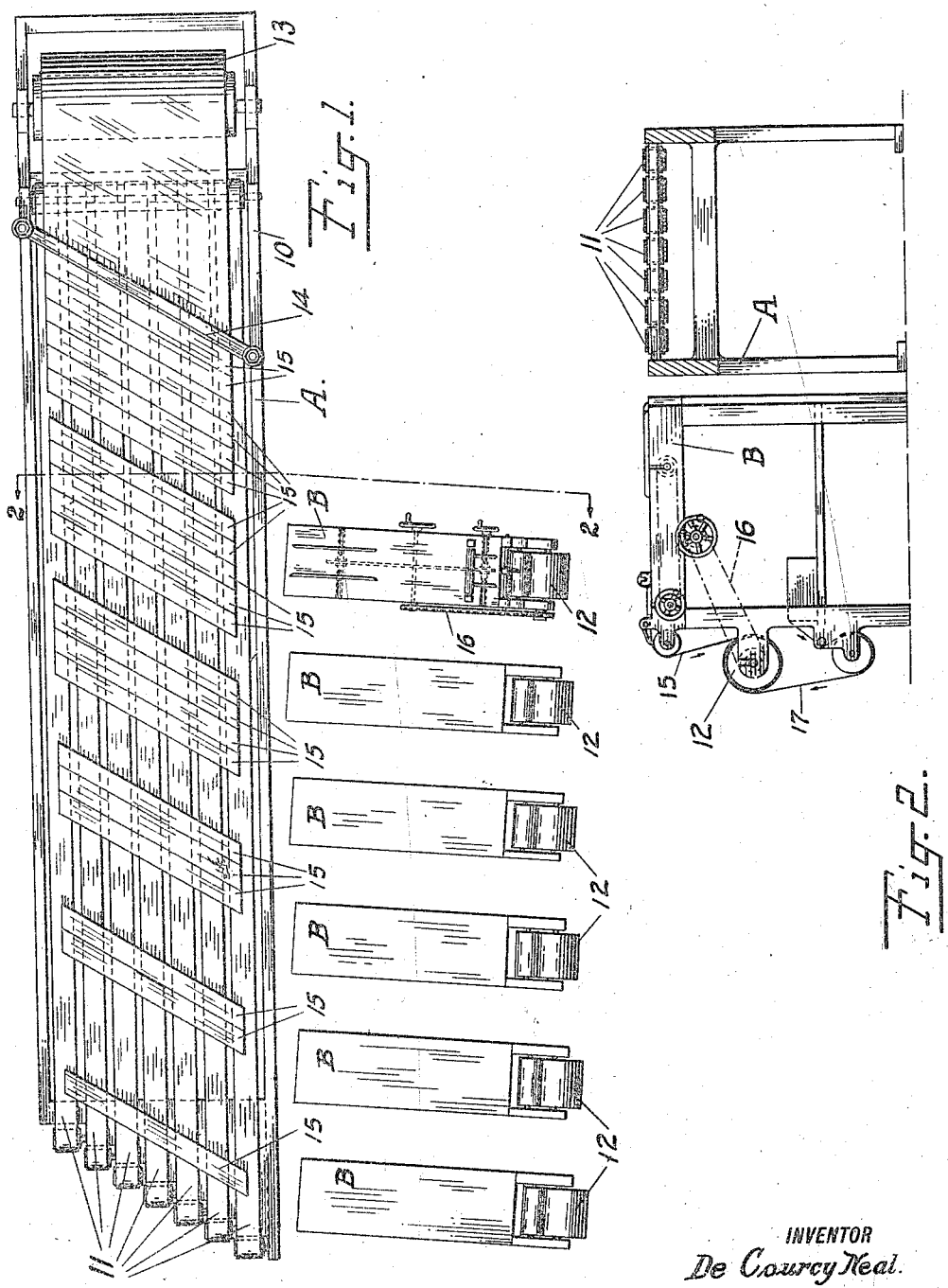

DE COURCY NEAL, OF DETROIT, MICHIGAN, ASSIGNOR TO MORGAN & WRIGHT, A CORPORATION OF MICHIGAN.

APPARATUS FOR AND PROCESS OF CUTTING AND REELING TIRE FABRIC.

1,189,724.   Specification of Letters Patent.   Patented July 4, 1916.

Application filed June 28, 1915. Serial No. 36,778.

*To all whom it may concern:*

Be it known that I, DE COURCY NEAL, a citizen of the United States, residing at Detroit, county of Wayne, State of Michigan, have invented certain new and useful Improvements in Apparatus for and Processes of Cutting and Reeling Tire Fabric, of which the following is a full, clear, and exact description.

This invention relates to processes for and methods of preparing rubber treated fabric for use in the construction of tires and has for an object to provide an apparatus and process whereby the use of the so-called books hitherto employed in handling such material, will be obviated.

Hitherto in the manufacture of bias cut rubber treated fabric for use in building tires, it has been customary to first cut bias strips from a traveling web of the rubber treated fabric, then place these bias cut strips in a book which consists of a board having a number of strips of muslin tacked to one edge, the bias cut strips being inserted between the muslin leaves of the book to prevent their sticking together while handling in transportation. Subsequently, these bias cut strips were removed from the book, placed upon a flat table, there spliced end to end, and then rolled up upon a reel with a liner strip of fabric between the convolutions of the roll to keep the convolutions from sticking together. The present invention provides means which dispenses with these books, and the attendant unnecessary handling and detrimental distortion of the fabric incident thereto, and this end is attained by the continuous reeling of the bias cut strips direct from a moving supply of the same.

The invention can be readily understood from the following description taken in connection with the accompanying drawing, in which—

Figure 1 is a diagrammatic plan view of apparatus which may be used in carrying out the invention; Fig. 2 is a cross-sectional view on the line 2—2, Fig. 1.

Briefly, the improvement consists in extending the table 10 of the bias cutting machine A, which carries the conveyer belts 11, three or four times its previous length and then locating along the side of the table, at an angle thereto, the reeling tables B, as indicated in Fig. 1. The strips of bias cut fabric are conveyed by the belts to these adjacent tables on which they are placed by the operator who does the reeling, and are there reeled up on the rolls at the ends 12, the successive pieces being spliced end to end prior to reeling as will be understood, to produce continuous strips of the bias cut fabric for use in the tire building machines.

In operation, a web from the roll of rubber treated fabric 13 is carried underneath the shear 14 of the bias cutting machine, where it is severed into bias cut strips 15 which are advanced by the belts 11 side by side in a continuation of the path of the web as shown. From this advancing supply of bias cut strips, the various operators stationed at the inner ends of the respective reeling machines B substantially simultaneously remove strips of the bias cut fabric, splice the same upon said tables, end to end, and reel the same upon the rolls 12. These rolls in the present embodiment are shown as manually driven by a chain drive 16, and as usual, are removably attached to their respective tables to permit of a full roll being removed and replaced with an empty one when necessary. A liner strip 17 of fabric is wound between the convolutions of the rubber treated fabric during this reeling operation. By thus cutting and immediately splicing and reeling the bias cut strips as above described, I am able to obtain a better joint at the splices than usual, since the freshness and consequently the adhesiveness of the raw rubber is better retained than possible with the use of books wherein the rubber is subject to deterioration from exposure to air, dust, and the like, as is well known. Consequently, the adhesiveness of such rubber is not equal to the adhesiveness of the fresh unpolluted raw rubber, from which I am enabled to form the splices or joints by splicing the bias cut strips immediately after the cutting operation and thereupon immediately reeling the same.

Having described my invention, what I claim and desire to protect by Letters Patent is:

1. The process of preparing rubber treated fabric, consisting of cutting a web of the fabric into bias strips, advancing said strips in a continuation of the path of said web, successively removing said strips from the advancing supply at successive stations, and splicing and reeling the strips at each of said stations.

2. The process of preparing rubber treated fabric consisting of cutting bias strips from a web of the fabric, continuously advancing said strips side by side, successively removing the strips endwise during the advance thereof at successive stations, splicing the freshly cut bias strips end to end and reeling the resultant continuous strips at each of said stations.

3. The process of preparing rubber treated fabric for use in building tires, consisting of cutting a traveling web of the fabric into bias strips, advancing said strips side by side in a continuation of the path of said web, removing certain of said strips from the advancing supply substantially simultaneously at predetermined stations, and at said stations splicing and reeling the corresponding strips.

4. Apparatus for preparing rubber treated fabric for use in building tires, comprising means for cutting a traveling web of the fabric into bias strips, means for advancing said strips side by side in a continuation of the path of said web, splicing tables disposed at intervals laterally of the path of said bias cut strips and adapted to permit of certain of said strips being substantially simultaneously transferred from said supply to said tables, and means on said tables for reeling the transferred strips subsequent to their being spliced end to end upon said tables.

5. Apparatus for preparing rubber treated fabric for use in building tires, consisting of a shear for cutting a traveling web of fabric into bias strips, a conveyer for advancing said strips side by side away from said shear, a plurality of splicing tables disposed at intervals along the side of said conveyer, the supply of bias cut strips on the conveyer moving progressively past the inner ends of the said tables and permitting certain of the strips being transferred substantially simultaneously from the supply to said tables and there spliced end to end, and means on said tables for reeling the corresponding strips.

Signed at Detroit, county of Wayne and State of Michigan, this 9th day of June, 1915.

DE COURCY NEAL.